(12) United States Patent　Kaufman

(10) Patent No.: US 10,171,758 B2
(45) Date of Patent: Jan. 1, 2019

(54) MULTI-SPECTRUM IMAGING

(71) Applicant: DIGITAL DIRECT IR, INC., Fresh Meadows, NY (US)

(72) Inventor: Peter N. Kaufman, Fresh Meadows, NY (US)

(73) Assignee: Digital Direct IR, Inc., Fresh Meadows, NY (US)

(*) Notice: Subject to any disclaimer, the term of this patent is extended or adjusted under 35 U.S.C. 154(b) by 208 days.

(21) Appl. No.: 15/099,558

(22) Filed: Apr. 14, 2016

(65) Prior Publication Data

US 2017/0026589 A1　　Jan. 26, 2017

Related U.S. Application Data

(60) Provisional application No. 62/147,572, filed on Apr. 14, 2015.

(51) Int. Cl.
| | | |
|---|---|---|
| *H04N 5/00* | (2011.01) | |
| *H04N 5/33* | (2006.01) | |
| *G01J 3/02* | (2006.01) | |
| *G01J 3/28* | (2006.01) | |
| *G01J 3/36* | (2006.01) | |

(Continued)

(52) U.S. Cl.
CPC ............. *H04N 5/332* (2013.01); *G01J 3/021* (2013.01); *G01J 3/0208* (2013.01); *G01J 3/2803* (2013.01); *G01J 3/36* (2013.01); *G01J 5/44* (2013.01); *G01J 2005/0077* (2013.01)

(58) Field of Classification Search
CPC ........ G01J 1/44; G01J 5/34; G01J 5/40; G01J 5/44; G01J 5/0806; G01J 5/046; G01J 5/0225; G01J 5/023; G01J 5/06; G01J 5/10; G01J 2005/0077; G01J 2005/065
See application file for complete search history.

(56) References Cited

U.S. PATENT DOCUMENTS

2002/0167589 A1* 11/2002 Schofield .............. B60N 2/002
　　　　　　　　　　　　　　　　　　　348/148
2004/0021766 A1*  2/2004 Daniilidis ............ H04N 5/2259
　　　　　　　　　　　　　　　　　　　348/36

(Continued)

OTHER PUBLICATIONS https://web.archive.org/web/20140324064834/https://en.wikipedia.org/wiki/Reflecting_telescope, Mar. 2014.*

*Primary Examiner* — Frank F Huang

(57) ABSTRACT

Multi-spectrum imaging systems and methods are provided to imaging in multiple spectrums, e.g., thermal IR (infrared) at 4 μm and 10 μm wavelengths, near-IR, and visible light, all on a same optical centerline. For example, an imaging system includes a first imager and a second imager. The first imager includes an array of thermal IR detectors, wherein the first imager is configured to receive incident photonic radiation and generate a thermal IR image, wherein each thermal IR detector comprises a photon absorber member that is configured to absorb thermal IR photonic radiation from the incident photonic radiation, and reflect remaining photonic radiation in the incident photonic radiation along an optical path of the imaging system. The second imager is disposed in said optical path of the imaging system, wherein the second imager is configured to receive the remaining photonic radiation reflected from the first imager and generate a second image.

8 Claims, 3 Drawing Sheets

(51) Int. Cl.
*G01J 5/44* (2006.01)
*G01J 5/00* (2006.01)

(56) References Cited

U.S. PATENT DOCUMENTS

| | | | | |
|---|---|---|---|---|
| 2007/0038567 A1* | 2/2007 | Allaire | ............... | G06Q 30/0239 |
| | | | | 705/50 |
| 2009/0231432 A1* | 9/2009 | Grigsy | ................... | G08G 1/161 |
| | | | | 348/149 |
| 2010/0284384 A1* | 11/2010 | Stahlin | ................ | H04W 76/002 |
| | | | | 370/338 |
| 2010/0303048 A1* | 12/2010 | Stahlin | ................... | H04W 84/12 |
| | | | | 370/338 |
| 2011/0098877 A1* | 4/2011 | Stahlin | ................... | G08G 1/161 |
| | | | | 701/31.4 |
| 2011/0128902 A1* | 6/2011 | Guo | ....................... | G08G 1/161 |
| | | | | 370/312 |
| 2011/0177791 A1* | 7/2011 | Stahlin | ................... | B60R 25/102 |
| | | | | 455/404.2 |
| 2011/0246594 A1* | 10/2011 | Cobbold | ................ | G06Q 10/10 |
| | | | | 709/206 |
| 2012/0062743 A1* | 3/2012 | Lynam | ................... | B60Q 9/005 |
| | | | | 348/148 |
| 2013/0214158 A1* | 8/2013 | Kaufman | ................. | G01J 5/34 |
| | | | | 250/338.1 |

* cited by examiner

MULTI-SPECTRUM IMAGING

CROSS-REFERENCE TO RELATED APPLICATION

This application claims priority to U.S. Provisional Patent Application Ser. No. 62/147,572, filed on Apr. 14, 2015, the disclosure of which is fully incorporated herein by reference.

TECHNICAL FIELD

This disclosure relates to imaging systems and methods and, in particular, multi-spectrum imaging techniques.

BACKGROUND

In general, conventional imaging systems are typically designed with optics and detectors that are configured for optimal operation in one particular spectral band (e.g., visible light). However, for certain applications, it is desirable to implement an imaging system that is designed for multi-spectral operation in two or more discrete spectral sub-bands of the electromagnetic spectrum such as visible/near IR and mid/long wavelength IR bands. Indeed, in certain applications, the ability to image a target scene in the visible and IR spectral bands can allow viewing of target objects/scenes in normal level lighting conditions as well as low-level light conditions (e.g., dusk, smoke, bad weather conditions, long distance or objects that are close to background levels or weak emitters). There are various applications, such as military applications, where imaging targets of interest over a wide range of photonic wavelengths is important or otherwise desirable. However, systems and devices for multispectral imaging applications (e.g., imaging in visible and infrared portions of the spectrum) are typically complex and costly, due to the different optics, image sensors and imaging electronics that are needed for each of the different spectral bands of interest. For multispectral applications, the use of refractive optics is especially problematic, where refractive optics are typically designed for specific spectral bands and cannot sufficiently provide wideband performance across a wide spectral range. Consequently for multispectral applications, different optics must be used for each spectral band of interest (i.e., the same refractive optics cannot be commonly used over a wide range of spectral bands).

SUMMARY

Embodiments of the invention include multi-spectrum imaging systems and methods. For example, an embodiment of the invention includes an imaging system comprising a first imager and a second imager. The first imager comprises an array of thermal IR detectors, wherein the first imager is configured to receive incident photonic radiation and generate a thermal IR image, wherein each thermal IR detector comprises a photon absorber member that is configured to absorb thermal IR photonic radiation from the incident photonic radiation, and reflect remaining photonic radiation in the incident photonic radiation along an optical path of the imaging system. The second imager is disposed in the optical path of the imaging system, wherein the second imager is configured to receive the remaining photonic radiation reflected from the first imager and generate a second image.

In another embodiment, the first imager generates a thermal IR image from thermal IR photonic radiation with a wavelength of about 4 microns or 10 microns, and the second imager comprise a visible light imager. En yet another embodiment, the second imager comprises a near-IR imager.

Other embodiments of the invention will be described in following detailed description of illustrative embodiments, which is to be read in conjunction with the accompanying drawings.

DETAILED DESCRIPTION

Embodiments of the invention will now be discussed in further detail with regard to multi-spectrum imaging systems and methods that are configured for imaging in multiple spectrums, e.g., thermal IR (infrared) at 4 μm and 10 μm wavelengths, near-IR, and visible light, all on a same optical centerline. It is to be understood that the various layers, structures, and regions shown in the accompanying drawings are schematic illustrations that are not drawn to scale. In addition, for ease of explanation, one or more structures, components, and configurations of a type commonly used to implement imaging systems and devices may not be explicitly shown in a given drawing. This does not imply that any of such stuctures, components, and configurations not explicitly shown are omitted from the actual imaging systems or devices. Moreover, the same or similar reference numbers are used throughout the drawings to denote the same or similar features, elements, or structures, and thus, a detailed explanation of the same or similar features, elements, or structures will not be repeated for each of the drawings. It is to be understood that the term "about" as used herein with regard to thicknesses, widths, percentages, ranges, etc., is meant to denote being close or approximate to, but not exactly. For example, the term "about" as used herein implies that a small margin of error is present, such as 1% or less than the stated amount.

Figure 1:
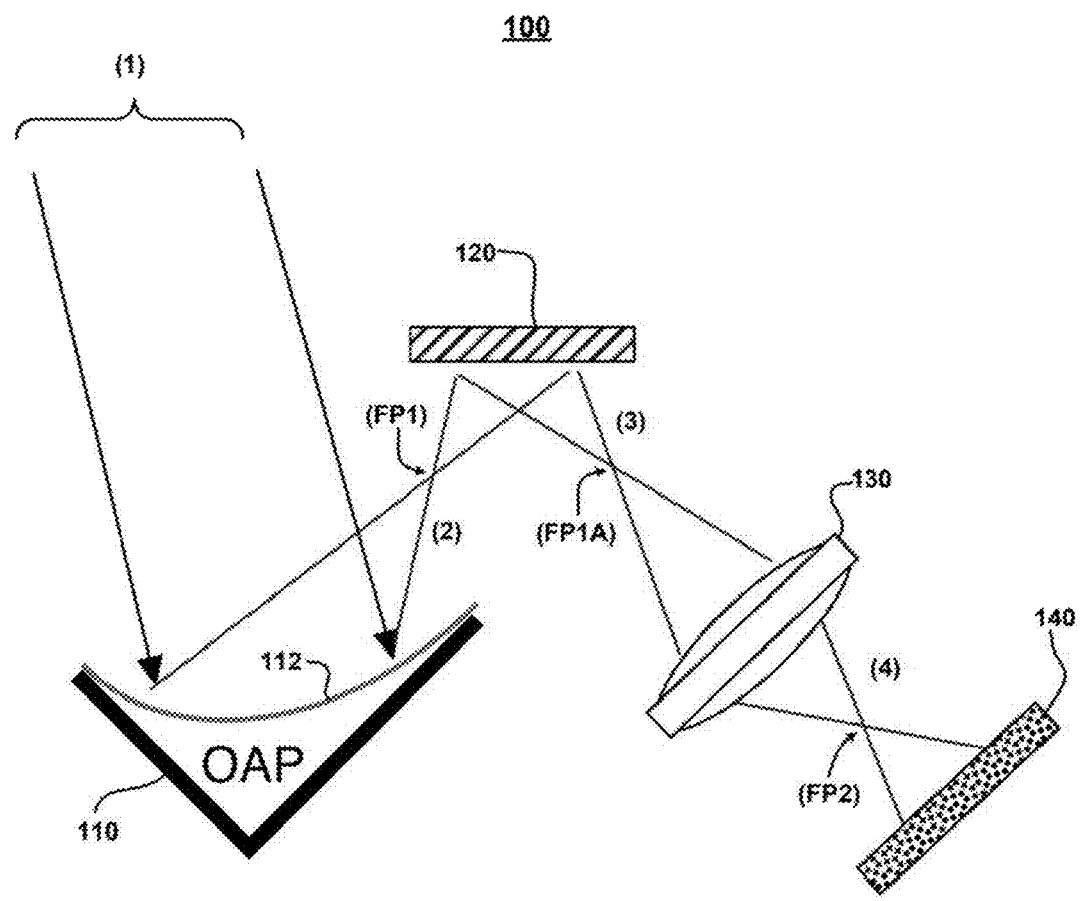
FIG. 1 schematically illustrates a system and method for implementing multi-spectral imaging according to an embodiment of the invention.

FIG. 1 schematically illustrates a system and method for implementing multi-spectral imaging according to an embodiment of the invention. In particular, as shown in FIG. 1, an imaging system 100 comprises an off-axis parabolic (OAP) mirror 110, a first imager 120, a lens, and a second imager 140. In one embodiment of the invention, the first imager 120 comprises a thermal IR focal plane array having detectors that are configured to absorb IR photons in the thermal IR spectrum (e.g., 4 μm and/or 10 μm) and reflect radiation at other wavelengths, and generate thermal IR images. In addition, in one embodiment of the invention, the second imager 140 comprises a focal plane array having detectors that are configured to detect photons in the visible and/or near-IR spectrums, and generate corresponding images.

In the system of FIG. 1, the wide spectrum primary OAP mirror 110 is used as a primary mirror for a multispectral imaging application. The OAP mirror 110 comprises a front parabolic reflective surface 112 that is configured to provide low loss reflection of photonic radiation over a wide spectrum as desired for the given application. The system 100 receives full spectrum incident photonic radiation (1) of a given image, which enters through an aperture of the OAP mirror 110. The OAP mirror 110 reflects the full spectrum of incident photonic radiation (1) from the reflective surface 112 and focuses the reflected incident photonic radiation (2) "off axis" to a focal point (FP1) leaving the area in front of the primary OAP mirror 110 unobstructed. While FIG. 1 illustrates one exemplary embodiment in which the OAP mirror 110 is used to focus incident photonic radiation (1), other optical elements can be used in place of the OAP mirror 110, which are capable of reflecting and focusing a wide spectrum of photonic radiation from UV (200 nm) through Far IR (25 μm), for example. Some examples are, but not limited to, Cassegrain mirrors, Cleartran lenses, etc.

The reflected photonic energy (2) that is focused by the primary OAP mirror 110 is directed to the first imager 120 (e.g., thermal IR imager). The first imager 120 absorbs the IR photons and creates a thermal IR image. The visible and near-IR photons are not absorbed by the first imager 120 but are reflected (3) off a surface of the first imager 120 and directed at the re-focusing lens 130. The re-focusing lens 130 receives the reflected photonic radiation (3) and focuses the photonic radiation to a focal point (FP2). The focused photonic radiation (4), which comprises visible and near-IR photons, is directed to the second imager 140 (e.g., visible and near-IR imager) to generate a visible light image, for example.

In the imaging system 100 of FIG. 1, the first imager 120 (e.g., thermal IR imager) serves multiple purposes. In addition to thermal IR imaging, the first imager 120 serves as a filter which separates the thermal IR radiation from the near-IR/visible radiation (by absorbing the thermal IR radiation), and further serves as a mirror which reflects the unfiltered near-IR and visible photonic radiation along the same optical path to one or more imagers (e.g., second imager 140). As compared to conventional imaging schemes that utilize lossy beam splitters, there are no photonic losses by virtue of the filtering and mirroring functions of the first imager 120.

The imaging system 100 of FIG. 1 takes advantage of the passive IR detector characteristics of the first imager 120 of having a surface material (i.e. Cu) that will absorb photonic energy in the 3 to 15 μm spectrum (mid and far thermal IR) and pass, or reflect, the spectrum (3) below 3 μm down to 200 nm, which includes near IR, visible and UV. In this respect the surface of the pixel acts as a filter that absorbs thermal IR and filters UV, visible and near IR. When the pixels are arranged in an FPA (focal plane array) they create a mirror surface suitable to reflect enough image area (3) to be transferred to the secondary imager 140. The system 100 is capable of imaging incident incoming photonic scene (1) in the visible, near mid and far IR, or a quad multi-spectral imaging system. Embodiments for implementing a thermal IR imager to serve as a filtering mirror will be discussed in farther detail below with reference to FIGS. 3 and 4, for example.

Figure 2:
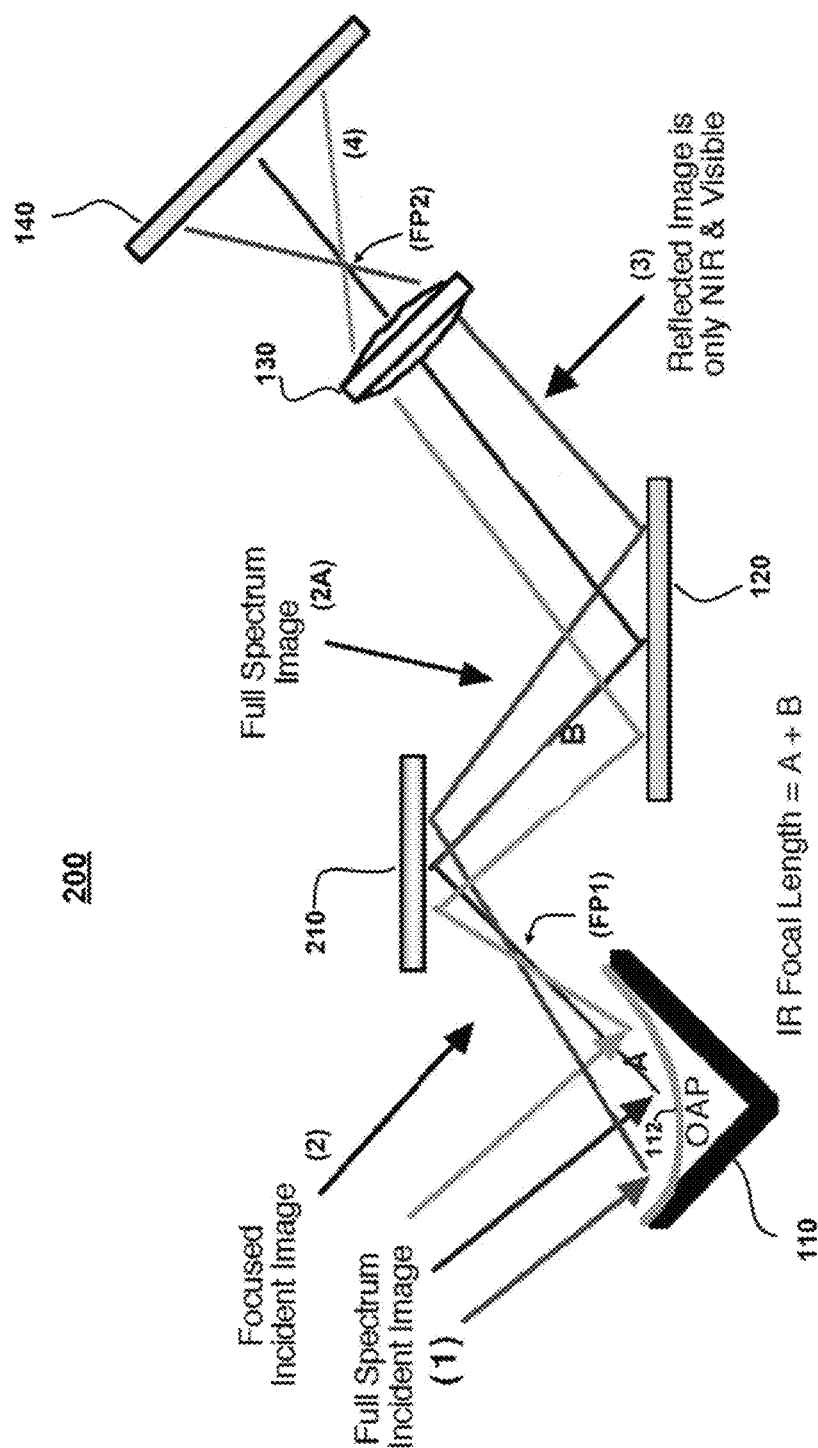
FIG. 2 schematically illustrates a system and method for implementing multi-spectral imaging according to another embodiment of the invention.

FIG. 2 schematically illustrates a system and method for implementing multi-spectral imaging according to another embodiment of the invention. In particular, FIG. 2 illustrates an imaging system 200 which is similar to the imaging system 100 of FIG. 1, but wherein the imaging system 200 of FIG. 2 includes a planar first surface mirror 210 interposed in the optical path between the primary OAP mirror 110 and the first imager 120 (e.g., thermal IR imager).

In the system of FIG. 2, the full spectrum of focused incident radiation (2), which is directed from the OAP mirror 110, is received by the planar first surface mirror 210 and then reflected (2A) towards the first imager 120. As with the system 100 of FIG. 1, the first imager 120 serves as a filter and mirror, which absorbs (filters) the thermal IR radiation from the reflected full spectrum of photonic radiation (2A) and reflects the remaining photonic radiation (3) (e.g., comprising visible and near-IR photonic radiation) toward the refocusing lens 130.

The mirror 210 is implemented to facilitate fitting all the system components in small or specially shaped enclosures. The second lens 130 is implemented to facilitate the requirements of the distance and focal length of the second imager 140. More specifically, in the system of FIG. 2, the total focal length from the OAP mirror 110 to the first imager 120 is equal to A+B. At the time the photonic radiation (3) reaches the refocusing lens 130, the focal length of the incident image is out of focus, and would generate blurred image (via the second imager 140) if not refocused. In this embodiment, the refocusing lens 130 is also used to control optical characteristics and distance from the reflecting imager 120 and the second imager 140. Here, the refocusing lens 130 is utilized to refocus the incoming photonic radiation (3) and direct focused photonic radiation (4) towards the second imager 140. In the system of FIG. 1, if the first and second imagers 120 and 140 are oriented in a proper optical orientation along the optical path, the refocusing lens 130 may not be needed. However, in FIG. 2, the refocusing lens 120 will correct the focal length and focus the photonic radiation to a focal point FP2.

Figure 3:
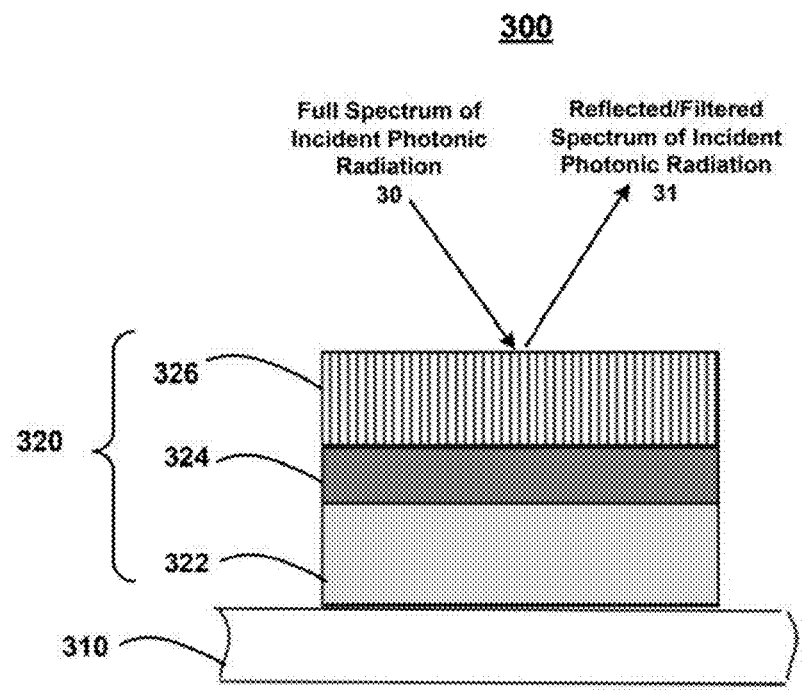
FIG. 3 schematically illustrates a thermal IR detector according to an embodiment of the invention, which can be implemented in a multi-spectral imaging system to provide thermal IR imaging, wherein the thermal IR detector is configured to further serve as a spectral filter and mirror in the multi-spectral imaging system.

FIG. 3 schematically illustrates a thermal IR detector according to an embodiment of the invention, which can be implemented in a multi-spectral imaging system to provide thermal IR imaging, wherein the thermal IR detector is configured to further serve as a spectral filter and mirror in the multi-spectral imaging system. In particular, FIG. 3 is a side schematic view of a thermal IR imaging device 300 according to an exemplary embodiment of the invention, which is based on a coefficient of thermal expansion (CTE) framework. The thermal IR imaging device 300 comprises a substrate 310 and a plurality of detectors 320 formed on the substrate 310. In one embodiment of the invention, the thermal imaging device 300 can be a focal plane array that is implemented in the multi-spectral imaging systems of FIGS. 1 and 2 as the first imager 120 to provide thermal IR imaging, wherein each detector 320 corresponds to one pixel in the thermal IR focal plane array.

As shown in FIG. 3, the detector 320 comprises a resonator member 332, a thermal insulating member 324, and an unpowered detector member 326. The resonator member 322 is configured to generate an output signal having a frequency or period of oscillation. The unpowered detector member 326 is configured to absorb photons in the thermal IR spectrum. The unpowered detector member 326 comprises a material having a thermal coefficient of expansion that causes the unpowered detector member 326 to distort (e.g., expand) due to absorption of thermal IR photons, and apply a mechanical force to the resonator member due 322 as a result of the distortion of the unpowered detector member 366 to cause a change in the frequency or period of oscillation of the output signal generated by the resonator member 322 due to the mechanical force applied to the resonator member 3222. The thermal insulating member 324 is configured to thermally insulate the resonator member 322 from the unpowered detector member 326.

Although not specifically shown, the substrate 310 comprises an integrated circuit comprising digital circuitry configured to (i) determine the frequency or period of oscillation of the output signal generated by the resonator member 322 as a result of the mechanical force applied to the resonator member 322 by the unpowered detector member 326, and to (ii) determine an amount of said photon exposure based on the determined frequency or period of oscillation of the output signal generated by the resonator member 322. The detector 320 is connected to the digital circuitry via first and second electrodes (not shown) that are connected to the resonator member 322, and other interconnect structures and wiring (e.g., BEOL wiring) as may be needed for a given layout.

In one embodiment of the invention, the unpowered detector member 326 is formed a material (or multiple materials) which can absorb photons in the thermal IR spectrum, and which have a suitable thermal coefficient of expansion characteristic. For example, in one embodiment of the invention, the unpowered detector member 326 is formed of copper, or other similar materials. The resonator member 322 is formed of a piezoelectric material that is configured to molecularly resonate in response to a drive voltage and generate an output signal having a frequency or period of oscillation, and which is configured to change the frequency or period of the output signal generated by the resonator member 322 in response to mechanical force exerted on the resonator member by expansion and contraction of the unpowered detector member 326. For example, in one embodiment of the invention, the resonator member 322 is formed of AlN (aluminum nitride), or other suitable piezoelectric materials. The thermal insulating member 324 can be formed of graphite, or other similar or suitable thermal insulating materials.

As shown in FIG. 3, a full spectrum of incident photonic radiation (30) is directed to the unpowered detector member 326 of the detector 300. The full spectrum of incident photonic radiation (30) comprises photonic radiation in the UV, visible, near-IR, mid-IR, far-IR spectrums, for example. The full spectrum of incident photonic radiation (30) can be, for example, the focused full spectrum photonic radiation (2) reflected from the OAP mirror 110 (FIG. 1) or the full spectrum photonic radiation (2A) reflected from the planar mirror 210 (FIG. 2). The unpowered detector member 326 serves as a filter by absorbing the thermal IR radiation (mid and far IR) at, e.g., 4 and 10 microns, and serves as a mirror by reflecting remaining photonic radiation (31) (e.g., remaining UV, visible and near IR radiation) off the surface of the unpowered detector member 326, which can be redirected or used for additional purposes as discussed above.

Figure 4:
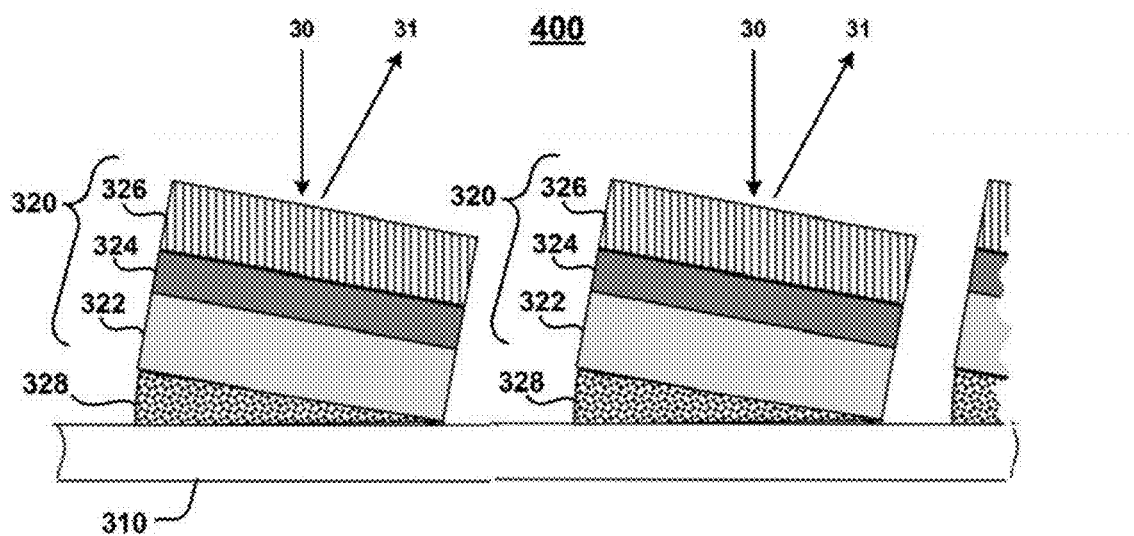
FIG. 4 schematically illustrates a thermal IR detector according to another embodiment of the invention, which can be implemented in a multi-spectral imaging system to provide thermal IR imaging, wherein the thermal IR detector is configured to further serve as a spectral filter and mirror in the multi-spectral imaging system.

FIG. 4 schematically illustrates a thermal IR detector according to another embodiment of the invention, which can be implemented in a multi-spectral imaging system to provide thermal IR imaging, wherein the thermal IR detector is configured to further serve as a spectral filter and mirror in the multi-spectral imaging system. In particular, FIG. 4 is a side schematic view of a thermal IR imaging device 400 according to an exemplary embodiment of the invention, which has a plurality of detectors 320 which are similar in structure and function to the detector 320 discussed above with reference to FIG. 3, but wherein each detector 320 is formed on wedge structure 328 to disposed each detector 320 at some angle from the plane of the substrate 310.

With the thermal IR imagine device 400 of FIG. 4, the plane of the substrate 310 can be disposed substantially perpendicular to an "optical centerline" of incoming incident photonic radiation 30, while allowing the reflected/filtered photonic radiation 31 to be directed away from each detector 320 at some reflection angle, which depends, in part, on the angle of the wedge structures 328, and directed towards some other imaging device or mirror in along an optical path of the multi-spectral imaging system. For example, the thermal IR imaging device 400 of FIG. 4 can be used to implement the first imager 120 in FIG. 1, such that the substrate plane of the first imager 120 can be positioned perpendicular to the optical centerline of the focused photonic radiation (2) directed from the OAP mirror 110, which still being able to direct reflected/filtered photonic radiation (30) towards the lens 130. Furthermore, the implementation of the angled pixel structure in FIG. 4 serves to accommodate the reflective characteristics of the absorber surface 326 which have been enhanced for better performance of the thermal IR with a textured surface or other coating materials.

In another embodiment the thermal IR imaging device 400 of FIG. 4 can be used in place of the OAP mirror 110 in FIGS. 1 and 2, wherein the substrate plane of the thermal IR imaging device 400 is positioned perpendicular to the optical centerline of focused light that is directed to the thermal IR imaging device 400 from a multi-spectral lens device that focuses incoming incident photonic radiation of an image from a scene. In the configuration, the thermal IR imaging device 400 reflects filtered photonic radiation "off axis" to downstream components (e.g., mirror, imager, etc.) of the multi-spectral imaging system without interference from the incoming incident photonic radiation The OAP mirror 110 in FIGS. 1 and 2, for example, can be fabricated using the materials and methods disclosed in U.S. patent application Ser. No. 14/315,270, filed on Jun. 25, 2014, entitled "Wide Spectrum Optical Systems and Devices Implementing First Surface Mirrors," to implement low cost first surface mirrors with wide spectrum performance. Moreover, it is to be understood that other thermal IR detector configurations can be implemented in the multispectral imaging systems as shown in FIGS. 1 and 2, and that the detector structures 320 shown in FIGS. 3 and 4 are just example embodiments. For example multispectral imaging systems according to embodiments of the invention can be implemented using various types of passive CTE-based photon detector structures as disclosed, for example, in U.S. patent application Ser. No. 15/099,440, filed on Apr. 14, 2016, U.S. Pat. No. 9,012,845, U.S. Provisional Application Ser. No. 62/206,798, filed on Aug. 18, 2015, and U.S. Provisional Application Ser. No 62/148,829, filed on Apr. 17, 2015, all of which are incorporated herein by reference. The passive detector structures and associated pixel circuitry disclosed in these patents can be used to implement thermal IR detectors (e.g., detectors 120 and 320) and associated pixel circuitry in the imaging systems disclosed herein.

Although exemplary embodiments of the invention have been described herein with reference to the accompanying drawings, it is to be understood that the scope of the invention is not limited to those precise embodiments, and that various other changes and modifications may be affected therein by one skilled in the art without departing from the scope or spirit of the invention.

What is claimed is:

1. An imaging system, comprising:

a first imager comprising an array of thermal infrared (IR) detectors, wherein the first imager is configured to receive incident photonic radiation and generate a thermal IR image, wherein each thermal IR detector comprises a photon absorber member that is configured to absorb thermal IR photonic radiation from the incident photonic radiation and convert the absorbed thermal IR photonic radiation to thermal energy, and reflect remaining photonic radiation in the incident photonic radiation along an optical path of the imaging system, wherein the photon absorber members within the array of thermal IR detectors collectively form a reflecting surface; and a second imager disposed in said optical path of the imaging system, wherein the second imager is configured to receive the remaining photonic radiation reflected from the reflective surface collectively formed by the photon absorber members within the array of thermal IR detectors of the first imager and generate a second image;

wherein the first imager comprises:

a substrate, wherein each thermal IR detector is formed on the substrate; and wherein each thermal IR detector further comprises:

a resonator member configured to generate an output signal having a frequency or period of oscillation; and wherein the photon absorber member comprises an unpowered detector member that is configured for photon exposure, wherein the unpowered detector member comprises a material having a thermal coefficient of expansion that causes the unpowered detector member to distort due to said photon exposure, wherein the unpowered detector member is further configured to apply a mechanical force to the resonator member due to said distortion of the unpowered detector member, and cause a change in the frequency or period of oscillation of the output signal generated by the resonator member due to said mechanical force applied to the resonator member; and a thermal insulating member configured to thermally insulate the resonator member from the unpowered detector member; and digital circuitry configured to (i) determine the frequency or period of oscillation of the output signal generated by the resonator member as a result of the mechanical force applied to the resonator member by the unpowered detector member, and to (ii) determine an amount of said photon exposure based on the determined frequency or period of oscillation of the output signal generated by the resonator member.

2. The imaging system of claim 1, wherein the first imager generates a thermal IR image from thermal IR photonic radiation with a wavelength of about 4 microns or 10 microns.

3. The imaging system of claim 1, wherein the second imager comprise a visible light imager.

4. The imaging system of claim 1, wherein the second imager comprises a near-IR imager.

5. The imaging system of claim 1, further comprising an off-axis parabolic mirror configured to focus the incident photonic radiation received by the first imager.

6. The imaging system of claim 5, further comprising a planar mirror disposed in said optical path between the off-axis parabolic mirror and the first imager.

7. The imaging system of claim 5, further comprising a lens disposed in said optical path between the first imager and the second imager, wherein the lens is configured to focus the remaining photonic radiation reflected from the first imager.

8. The imaging system of claim 1, wherein each thermal IR detector comprises a wedge structure that maintains the thermal IR detector at an angle with regard to a plane of the substrate.

* * * * *